(12) United States Patent
Chen et al.

(10) Patent No.: US 11,449,616 B2
(45) Date of Patent: Sep. 20, 2022

(54) APPLICATION MANAGEMENT METHOD FOR TERMINAL, APPLICATION SERVER, AND TERMINAL

(71) Applicant: CHINA UNIONPAY CO., LTD., Shanghai (CN)

(72) Inventors: Chengqian Chen, Shanghai (CN); Yu Zhou, Shanghai (CN); Wei Guo, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 426 days.

(21) Appl. No.: 16/618,312

(22) PCT Filed: May 25, 2018

(86) PCT No.: PCT/CN2018/088367
§ 371 (c)(1),
(2) Date: Nov. 29, 2019

(87) PCT Pub. No.: WO2019/128075
PCT Pub. Date: Jul. 4, 2019

(65) Prior Publication Data
US 2021/0157922 A1     May 27, 2021

(30) Foreign Application Priority Data
Dec. 27, 2017   (CN) .......................... 201711449381.1

(51) Int. Cl.
*G06F 21/57*      (2013.01)
*G06F 8/61*       (2018.01)
(52) U.S. Cl.
CPC .............. *G06F 21/577* (2013.01); *G06F 8/61* (2013.01); *G06F 2221/033* (2013.01)

(58) Field of Classification Search
CPC ... H04L 9/3247; H04L 9/3236; H04L 9/3242; H04L 63/123; H04L 63/12;
(Continued)

(56) References Cited

U.S. PATENT DOCUMENTS 8,261,365 B2 * 9/2012 Ksontini ................. H04L 63/10
455/26.1
9,313,218 B1 * 4/2016 Savant ................ H04L 63/1408
(Continued)

FOREIGN PATENT DOCUMENTS

CA       2622577 A1    3/2007
CN    102024127 A     4/2011
(Continued)

OTHER PUBLICATIONS

The World Intellectual Property Organization (WIPO) International Search Report for PCT/CN2018/088367 dated Sep. 10, 2018 8 pages.
(Continued)

*Primary Examiner* — Tae K Kim
(74) *Attorney, Agent, or Firm* — Anova Law Group, PLLC

(57) ABSTRACT

Embodiments of the present invention disclose an application management method for terminals, including: after receiving the application download request sent by the terminal, the application server sends the corresponding application installation package to the terminal. Then, the first verification message sent by the terminal is received, and the first verification message is generated by the terminal according to the content of the received application installation package. After determining that the first verification message is consistent with a stored second verification message, the application server sends an permit-to-install message to the terminal, so that the terminal installs
(Continued)

the application according to the received application installation package. Because the application server determines the legitimacy of the application package, it does not need the terminal to verify by using the certificate, thereby reducing the certificate work management for the terminal and improving the efficiency of application installation.

10 Claims, 6 Drawing Sheets

(58) Field of Classification Search
CPC ......... H04L 2463/102; H04L 2463/101; H04L 2209/60; G06F 21/64; G06F 21/645; G06F 21/51; G06F 21/50; G06F 21/577; G06F 21/565; G06F 21/56; G06F 21/562; G06F 21/57
See application file for complete search history.

(56) References Cited

U.S. PATENT DOCUMENTS

| | | | | |
|---|---|---|---|---|
| 9,569,618 | B2* | 2/2017 | Lee | G06F 21/52 |
| 9,867,051 | B2* | 1/2018 | Park | H04W 12/37 |
| 10,248,788 | B2* | 4/2019 | Deng | G06F 21/562 |
| 2013/0232229 | A1* | 9/2013 | Firman | G06F 8/61 |
| | | | | 709/219 |
| 2013/0268753 | A1* | 10/2013 | Vanderpol | G06F 21/567 |
| | | | | 713/155 |
| 2013/0297934 | A1* | 11/2013 | Suni | H04L 9/321 |
| | | | | 713/156 |
| 2014/0090077 | A1* | 3/2014 | Jeong | G06F 21/60 |
| | | | | 726/26 |
| 2014/0096246 | A1* | 4/2014 | Morrissey | H04W 12/128 |
| | | | | 726/23 |
| 2014/0150096 | A1* | 5/2014 | Moon | G06F 21/51 |
| | | | | 726/22 |
| 2014/0215220 | A1* | 7/2014 | Kim | G06F 21/6272 |
| | | | | 713/176 |
| 2015/0180908 | A1* | 6/2015 | Dang | H04W 12/128 |
| | | | | 726/1 |
| 2015/0271679 | A1* | 9/2015 | Park | H04W 12/37 |
| | | | | 713/187 |
| 2016/0014123 | A1* | 1/2016 | Shin | G06F 21/51 |
| | | | | 713/152 |
| 2017/0244729 | A1* | 8/2017 | Fahmy | H04L 63/0823 |
| 2018/0107468 | A1* | 4/2018 | Huang | H04W 8/24 |

FOREIGN PATENT DOCUMENTS

| | | | | |
|---|---|---|---|---|
| CN | 102300065 | A | | 8/2011 |
| CN | 102982258 | A | | 3/2013 |
| CN | 103577206 | A | | 2/2014 |
| CN | 103632089 | A | | 3/2014 |
| CN | 104683303 | A | * | 6/2015 |
| CN | 104683303 | A | | 6/2015 |
| CN | 105354488 | A | | 2/2016 |
| CN | 105450714 | A | | 3/2016 |
| CN | 107169318 | A | | 9/2017 |
| JP | 2009251977 | A | | 10/2009 |
| JP | 2014048866 | A | | 3/2014 |
| JP | 2014048889 | A | | 3/2014 |
| JP | 2014048984 | A | | 3/2014 |
| JP | 2015079440 | A | | 4/2015 |
| KR | 20150117336 | A | | 10/2015 |
| WO | 2017079866 | A1 | | 5/2017 |
| WO | WO-2017206185 | A1 | * | 12/2017 ............. G06F 21/57 |

OTHER PUBLICATIONS

The European Patent Office (EPO) the Extended European Search Report for 18893709.8 dated Mar. 27, 2020 8 Pages.
Chunlei Yang et al., Security Systems of Point-of-Sales Devices, Int. J. Adv. Manuf Technol, 2007. 34: p. 799-815. DOI 10.1007/s00170-006-0638-8, Springer-Verlag London Limited.

* cited by examiner

APPLICATION MANAGEMENT METHOD FOR TERMINAL, APPLICATION SERVER, AND TERMINAL

RELATED APPLICATIONS

This application is a national stage entry of International Patent Application No. PCT/CN2018/088367, filed on May 25, 2018, which claims priority to Chinese Patent Application No. 201711449381.1, titled "APPLICATION MANAGEMENT METHOD FOR TERMINAL, APPLICATION SERVER, AND TERMINAL", filed on Dec. 27, 2017, which is incorporated by reference in its entirety.

FIELD OF THE TECHNOLOGY

This application relates to the field of application management technologies and, specifically, to an application management method for terminals, an application server, and terminal.

BACKGROUND

At present, smart point of sale (POS) terminals mostly are based on the Android system. On the basis of the Android system, individual manufacturers customizes the smart POS, including system security, operating system application management, application stores, payment, and scanning functions, etc. Thus, a smart POS is a relatively closed system, the applications installed on the smart POS need to be strictly controlled. In the existing technology, the back-end server of the application needs to re-sign and package the application submitted by the application developer, and then sends the application to the smart POS. Before installing the application, the smart POS uses the certificate to verify the signature of the application. After the verification is passed, the application is then installed. If the verification fails, it is considered that the application package is not sent by the trusted background, and the application is not installed. However, the method of verifying the application by using a certificate adds work of managing the certificate to the POS. In addition, when the certificate needs to be updated, all corresponding POSs also need to update the certificate, which is cumbersome and affects the performance of the POS.

SUMMARY

Embodiments of the present invention provides an application management method for terminals, an application server, and a terminal, which are used to solve the problem of increasing work and decreasing efficiency of the POS under the method of verifying the security of an application by using the certificate.

In a first aspect, embodiments of the present invention provide an application management method for a terminal, including: an application server receiving an application download request sent by the terminal; the application server sending an application installation package corresponding to the application download request to the terminal, the application installation package having passed a security check by the application server; the application server receiving a first verification message sent by the terminal, wherein the first verification message is generated by the terminal according to content of the received application installation package; the application server comparing the first verification message with a stored second verification message, wherein the second verification message is generated by the application server according to content of the application installation package having passed the security check; and after determining that the first verification message is consistent with the second verification message, the application server sending a permit-to-install message to the terminal, such that the terminal installs an application according to the received application installation package.

Optionally, the verification message carries an application identifier corresponding to the application installation package. The application server comparing the first verification message with a stored second verification message further includes: determining, by the application server, the second verification message corresponding to the application identifier from stored verification messages according to the application identifier carried in the first verification message; and comparing, by the application server, the first verification message with the second verification message corresponding to the application identifier.

Optionally, the method further includes: the application server receiving a verification message list sent by the terminal, wherein the verification message list is generated by the terminal according to content of installed application installation packages; the application server comparing verification messages in the verification message list with stored verification messages; after determining that a verification message in the verification message list is inconsistent with the stored verification messages, the application server determining an abnormal application on the terminal according to the inconsistent verification message; and the application server sending a reminder message corresponding to the abnormal application to the terminal.

In a second aspect, embodiments of the present invention provide an application management method for a terminal, including: the terminal sending an application download request to an application server; the terminal receiving an application installation package sent by the application server, and generating a first verification message according to content of the received application installation package, wherein the application installation package sent by the application server has passed a security check; the terminal sending the first verification message to the application server, such that the application server compares the first verification message with a stored second verification message, wherein the stored second verification message is generated by the application server according to content of the application installation package having passed the security check; and after receiving a permit-to-install message sent by the application server, the terminal installing an application according to the received application installation package, wherein the permit-to-install message is sent by the application server after determining that the first verification message and the second verification message are consistent.

Optionally, the verification message carries an application identifier corresponding to the application installation package. The terminal sending the first verification message to the application server further includes: the terminal sending the first verification message that carries the application identifier corresponding to the application installation package to the application server, such that the application server determines, according to the application identifier carried in the first verification message, a corresponding second verification message from the stored verification messages.

Optionally, the method also includes: the terminal generating a verification message list according to the content of installed application installation packages; the terminal sending the verification message list to the application server, such that the application server compares verification messages in the verification message list with the stored verification messages; and after receiving a reminder message sent by the application server corresponding to an abnormal application, the terminal determining the abnormal application according to the reminder message, wherein the abnormal application is determined based on a verification message in the verification message list that is inconsistent with the stored verification messages as determined by the application server.

In a third aspect, embodiments of the present invention provide an application server, including: a first receiving module configured to receive an application download request sent by a terminal; a first sending module configured to send an application installation package corresponding to the application download request to the terminal, the application installation package having passed a security check by the application server, wherein the first receiving module is configured to receive a first verification message sent by the terminal, and the first verification message is generated by the terminal according to content of the received application installation package; and a first processing module configured to compare the first verification message with a stored second verification message, wherein the second verification message is generated by the application server according to content of the application installation package having passed the security check, and after determining that the first verification message is consistent with the second verification message, to send a permit-to-install message to the terminal, such that the terminal installs an application according to the received application installation package.

Optionally, the verification message carries an application identifier corresponding to the application installation package. The first processing module is specifically configured to determine the second verification message corresponding to the application identifier from stored verification messages according to the application identifier carried in the first verification message, and to compare the first verification message with the second verification message corresponding to the application identifier.

Optionally, the first receiving module is further configured to: receive a verification message list sent by the terminal, wherein the verification message list is generated by the terminal according to content of installed application installation packages; the first processing module is further configured to: compare verification messages in the verification message list with stored verification messages, and, after determining that a verification message in the verification message list is inconsistent with the stored verification messages, determine an abnormal application on the terminal according to the inconsistent verification message; and the first sending module is further configured to: send a reminder message corresponding to the abnormal application to the terminal.

In a fourth aspect, embodiments of the present invention provide a terminal, including: a second sending module configured to send an application download request to the application server; a second receiving module configured to receive an application installation package sent by the application server, and generate a first verification message according to content of the received application installation package, wherein the application installation package sent by the application server has passed a security check; wherein the second sending module is configured to send the first verification message to the application server, such that the application server compares the first verification message with a stored second verification message; and wherein the stored second verification message is generated by the application server according to content of the application installation package having passed the security check; and a second processing module configured to, after receiving a permit-to-install message sent by the application server, install an application according to the received application installation package, wherein the permit-to-install message is sent by the application server after determining that the first verification message and the second verification message are consistent.

Optionally, the verification message carries an application identifier corresponding to the application installation package. The second sending module is configured to send the first verification message that carries the application identifier corresponding to the application installation package to the application server, such that the application server determines, according to the application identifier carried in the first verification message, a corresponding second verification message from the stored verification messages.

Optionally, the second processing module is further configured to: generate a verification message list according to the content of installed application installation packages; the second sending module is further configured to: the verification message list to the application server, such that the application server compares verification messages in the verification message list with the stored verification messages; and the second processing module is further configured to: after receiving a reminder message sent by the application server corresponding to an abnormal application, determining, by the terminal, the abnormal application according to the reminder message, wherein the abnormal application is determined based on a verification message in the verification message list that is inconsistent with the stored verification messages as determined by the application server.

In a fifth aspect, embodiments of the present invention provide an application server, including: at least one processor; and a memory communicatively coupled to the at least one processor, wherein the memory stores instructions executable by the at least one processor, the instructions being executed by the at least one processor to enable the at least one processor to perform the method in the first aspect.

In a sixth aspect, embodiments of the present invention provide a terminal, including: at least one processor; and a memory communicatively coupled to the at least one processor, wherein the memory stores instructions executable by the at least one processor, the instructions being executed by the at least one processor to enable the at least one processor to perform the method in the second aspect.

In a seventh aspect, embodiments of the present invention provides a computing device, including: a memory for storing program instructions; and a processor for invoking program instructions stored in the memory and, according to the obtained program, performing the method in the first aspect or the second aspect.

In an eighth aspect, embodiments of the present invention provide a computer readable storage medium storing computer executable instructions for causing a computer to perform the method in the first aspect or the second aspect.

Accordingly, the embodiments of the present invention provide an application management method for a terminal, an application server, and a terminal, including: an application server receives an application download request sent by a terminal; the application server sends an application installation package corresponding to the application download request to the terminal, where the application installation package passes the security check by the application server;

the application server receives the first verification message sent by the terminal, and the first verification message is generated by the terminal according to the content of the received application installation package; the application server compares the first verification message with a stored second verification message, and the second verification message is generated by the application server according to the content of the application installation package that passes the security check; after determining that the first verification message is consistent with the second verification message, the application server sends a permit-to-install message to the terminal, so that the terminal installs the application according to the received application installation package. Accordingly, the application server, after the security check of the application installation package, generates the second verification message according to the content of the application installation package. After receiving the application installation package, the terminal generates the first verification message according to the content of the received application installation package, and sends the first verification message to the application server, and then the application server determines, according to the first verification message and the second verification message, the legitimacy of the application package received by the terminal is verified. That is, it does not need the terminal to verify the legitimacy of the application package by using the certificate, thereby reducing the certificate work management for the terminal and improving the efficiency of application installation. Further, when the application verification method needs to be upgraded, only the application server needs to be upgraded or replaced, and the terminal is not required to be upgraded or replaced, thereby improving the timeliness of the application verification upgrade.

BRIEF DESCRIPTION OF THE DRAWINGS

The one or more embodiments are exemplified by the figures in the accompanying drawings, which do not constitute any limitation to the embodiments of the present invention. In the figures, parts with same reference numeral numbers may indicate similar parts and, unless otherwise stated, the figures may be not drawn proportionally.

DESCRIPTION OF EMBODIMENTS

To make clearer of the objectives, technical solutions, and advantages of the present disclosure, the followings further describe the present disclosure in detail with reference to the accompanying drawings and embodiments. It is understood that the specific embodiments described herein are merely illustrative of the present invention and are not intended to limit the present invention.

Figure 1:
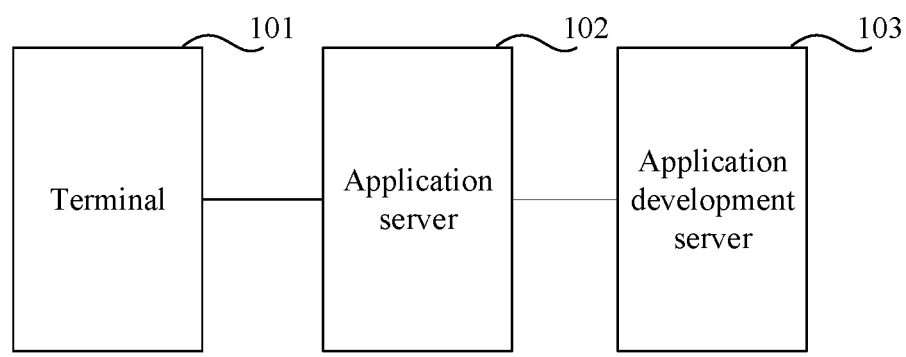
FIG. 1 illustrates a system structural diagram according to an embodiment of the present invention.

FIG. 1 is a schematic diagram showing a system architecture applicable to an embodiment of the present invention. As shown in FIG. 1, a system architecture applicable to an embodiment of the present invention includes a terminal 101, an application server 102, and an application development server 103. The terminal 101 and the application server 102 may be wirelessly connected, and the application server 102 may be wirelessly connected to the application development server 103. The terminal 101 includes, but is not limited to, a POS, a mobile phone, a personal computer (PC), a portable computer, or a personal digital assistant (PDA). After the application development server 103 develops an application that meets the security requirements of the application server 102, the application installation package is transmitted to the application server 102. The application server 102 performs a security check on the received application installation package and, after determining that the application installation package passed the security check, generates a verification message according to the content of the application installation package and saves in a storage. It should be noted that the application server can receive application installation packages sent by one or more application development servers and perform the security check on the application installation packages.

Figure 2:
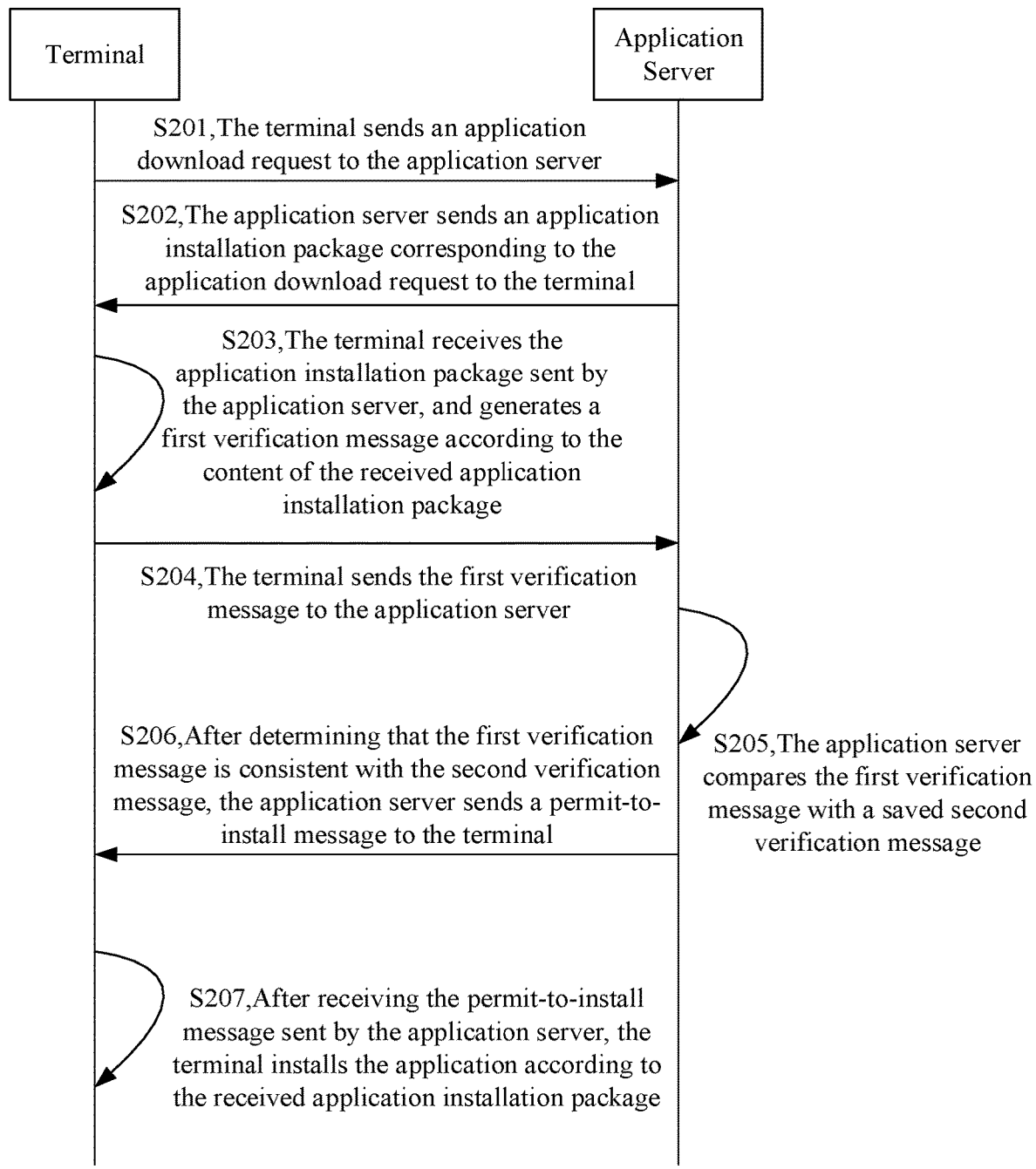
FIG. 2 illustrates a schematic flowchart of an application management method for a terminal according to an embodiment of the present invention.

Based on the system architecture shown in FIG. 1, as shown in FIG. 2, an embodiment of the present invention provides an application management method for a terminal, including the following steps.

Step S201: The terminal sends an application download request to the application server.

Step S202: The application server sends an application installation package corresponding to the application download request to the terminal.

Step S203: The terminal receives the application installation package sent by the application server, and generates a first verification message according to the content of the received application installation package.

Step S204: The terminal sends the first verification message to the application server.

Step S205: The application server compares the first verification message with a saved second verification message.

Step S206: After determining that the first verification message is consistent with the second verification message, the application server sends a permit-to-install message to the terminal.

Step S207: After receiving the permit-to-install message sent by the application server, the terminal installs the application according to the received application installation package.

Specifically, in Step S201 and Step S202, the application installation package sent by the application server to the terminal is an application installation package sent by the application development server to the application server and approved by the application server. Further, the application server generates a corresponding verification message according to the content of the application installation package and stores the verification message. The verification message is uniquely determined according to the content of the application installation package, and different application installation packages correspond to different verification messages. The verification message also changes when the content of the same application installation package is changed. In a specific implementation, the verification message may be a message digest (hash value), or may be a part of content randomly selected from the application installation package, or may be other parameters that uniquely represent the content of the application installation package.

In Step S203 and Step S204, the first verification message may carry an application identifier corresponding to the application installation package. The application identifier is used to identify the application category, the name, and the like, so that, after receiving the first verification message carrying the application identifier, the application server can determine the application corresponding to the first verification message. For example, when receiving the application installation package corresponding to a code-scanning application, the terminal generates a message digest according to the content of the installation package of the code-scanning application, and then sends the message digest and the application identifier of the code-scanning application to the application server. After receiving the message digest and the application identifier, the application server determines that the message digest is a message digest corresponding to the code-scanning application.

In Step S205 and Step S206, the second verification message is generated by the application server according to the content of the application installation package passing the security check. The first verification message corresponds to an application installation package received by the terminal, and the second verification corresponds to an application installation package sent by the application server. The first verification message and the second verification message may or may not be consistent. When the content of the application installation package is not changed during the processes where the application installation package is sent from the application server to the terminal and the terminal receives application installation package, and before the terminal installs the application, the first verification message generated by the terminal according to the content of the application installation package should be consistent with the second verification message generated by the server according to the content of the application installation package. When the content of the application installation package is changed during the processes where the application installation package is sent from the application server to the terminal and the terminal receives application installation package, and before the terminal installs the application, the first verification message generated by the terminal according to the content of the application installation package are not consistent with the second verification message generated by the server according to the content of the application installation package.

Further, when the first verification message is compared with the second verification message, if the first verification message carries the application identifier corresponding to the application installation package, the application server can, based on the application identifier carried in the first verification message, determine the second verification message corresponding to the application identifier from stored verification messages and, then, compare the first verification message with the second verification message corresponding to the application identifier. When it is determined that the first verification message is consistent with the second verification message, a permit-to-install message is sent to the terminal. When it is determined that the first verification message is inconsistent with the second verification message, a prohibit-to-install message is sent to the terminal.

If the first verification message does not carry the application identifier corresponding to the application installation package, the application server cannot directly determine the second verification message corresponding to the first verification message from the stored verification messages. The application server needs to compare the first verification message with the stored verification messages. When there is a verification message consistent with the first verification message among the stored verification messages, then the verification message is the second verification message, and then the permit-to-install the message is sent to the terminal. When it is determined that no stored verification message is consistent with the first verification message, the prohibit-to-install message is sent to the terminal.

In Step S207, after receiving the permit-to-install message sent by the application server, the terminal installs the application according to the received application installation package. The terminal deletes the application installation package after receiving the prohibit-to-install message sent by the application server.

Accordingly, the application server, after the security check of the application installation package, generates the second verification message according to the content of the application installation package. After receiving the application installation package, the terminal generates the first verification message according to the content of the received application installation package, and sends the first verification message to the application server, and then the application server determines, according to the first verification message and the second verification message, the legitimacy of the application package received by the terminal is verified. That is, it does not need the terminal to verify the legitimacy of the application package by using the certificate, thereby reducing the certificate work management for the terminal and improving the efficiency of application installation. Further, when the application verification method needs to be upgraded, only the application server needs to be upgraded or replaced, and the terminal is not required to be upgraded or replaced, thereby improving the timeliness of the application verification upgrade.

Figure 3:
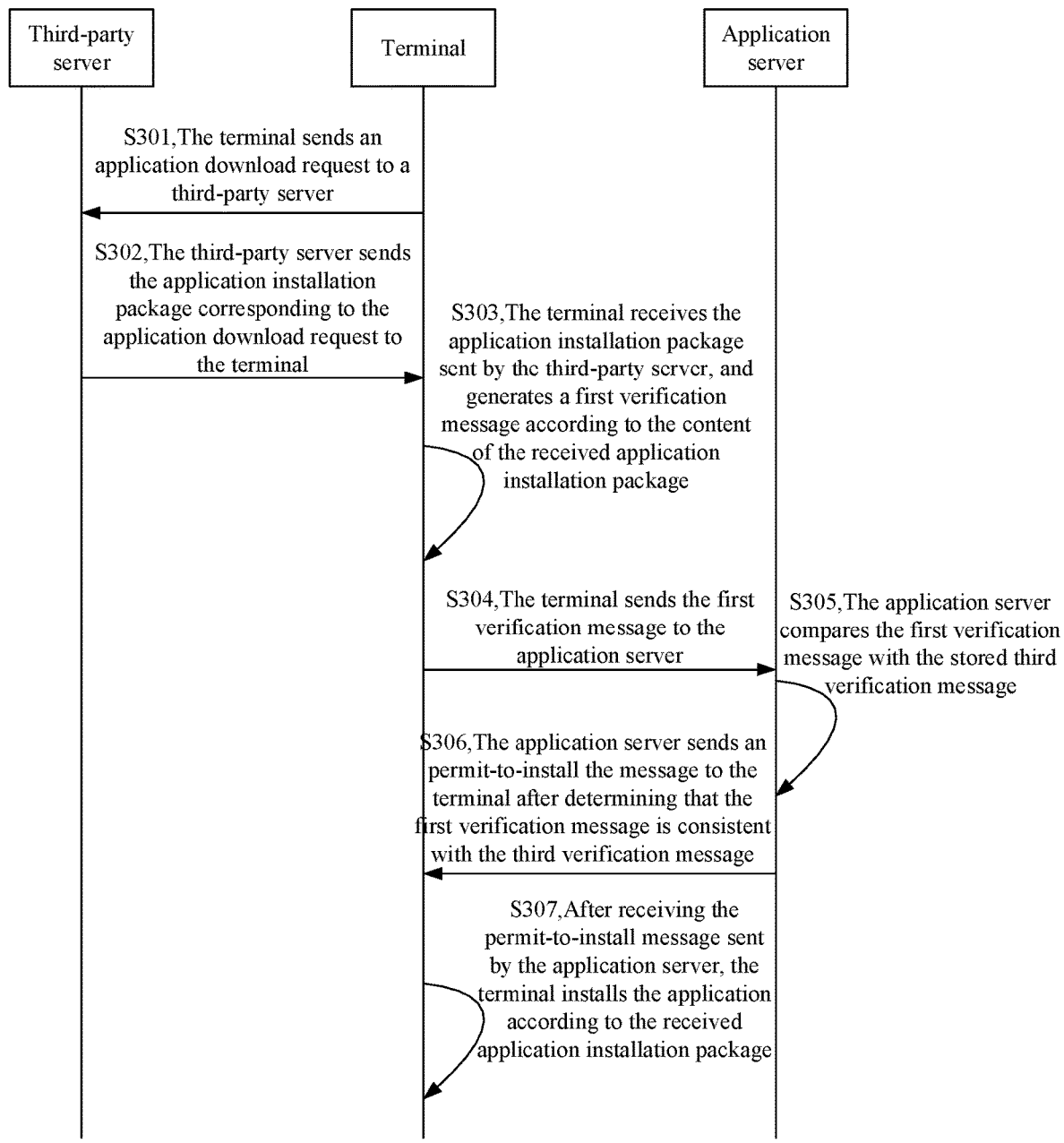
FIG. 3 illustrates a schematic flowchart of another application management method for a terminal according to an embodiment of the present invention.

Optionally, the terminal not only obtains the application installation package from the application server, but also may obtain the application installation package from a third-party server other than the application server, and the specific process is as shown in FIG. 3.

Step S301: The terminal sends an application download request to a third-party server.

Step S302: The third-party server sends the application installation package corresponding to the application download request to the terminal.

Step S303: The terminal receives the application installation package sent by the third-party server, and generates a first verification message according to the content of the received application installation package.

Step S304: The terminal sends the first verification message to the application server.

Step S305: The application server compares the first verification message with the stored third verification message.

Step S306: The application server sends an permit-to-install the message to the terminal after determining that the first verification message is consistent with the third verification message.

Step S307: After receiving the permit-to-install message sent by the application server, the terminal installs the application according to the received application installation package.

In a specific implementation, the third verification message is generated by the application server according to the content of the application installation package sent by the third-party server and passing the security check. Specifically, the third-party server sends the application installation package to the application server, and the application server performs security check on the application installation package. After the application server approves the security check, a third verification message is generated according to the content of the application installation package, and the third verification message is stored. If the third-party server does not send the application installation package to the application server for security check, the third verification message corresponding to the application installation package will not be saved in the application server. Thus, after the third-party server sends the application installation package to the application server for security check, the terminal can achieve the application download from the third-party server, providing multiple ways for the terminal to download the application, and facilitating the terminal to download the application.

Figure 4:
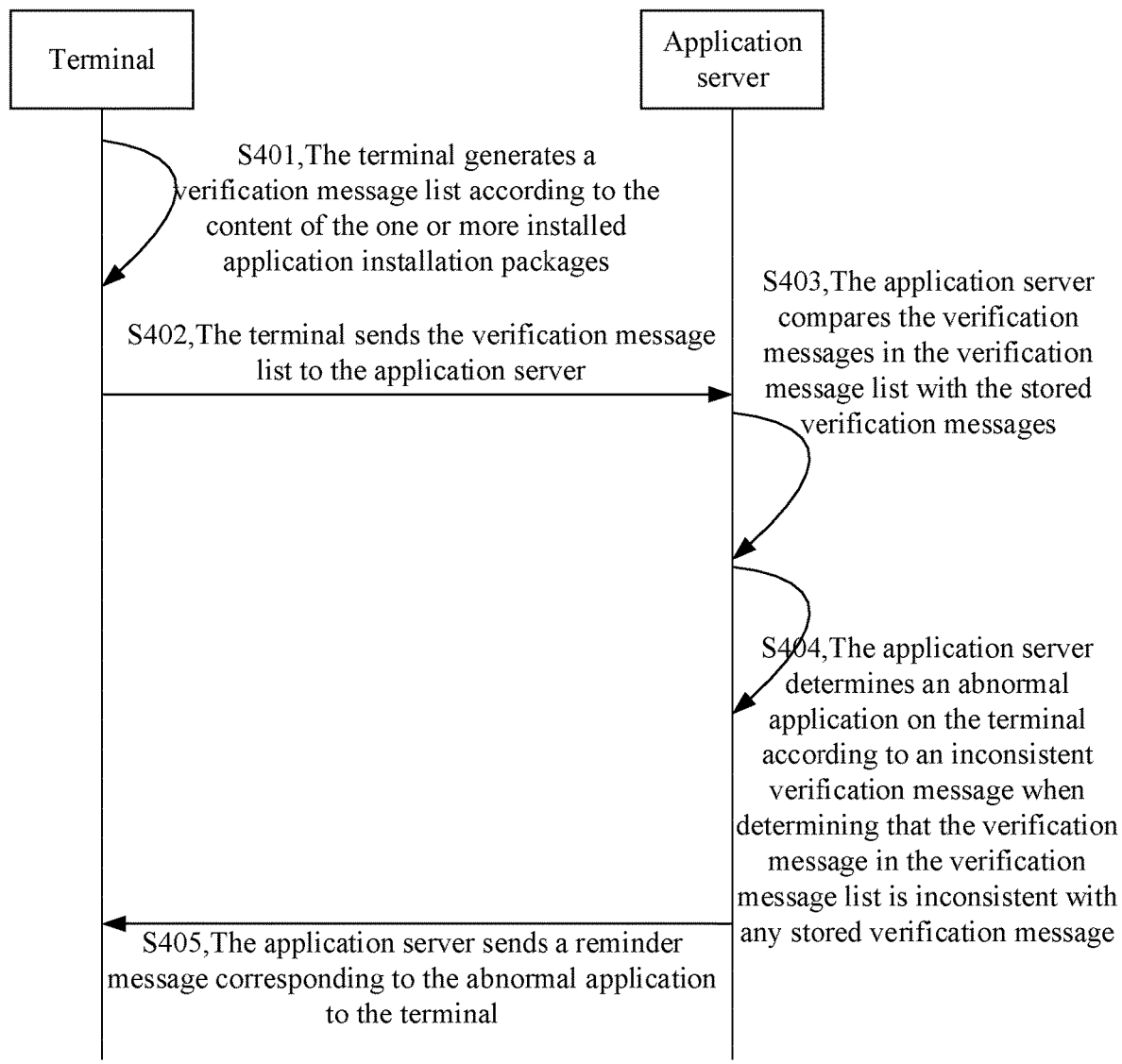
FIG. 4 illustrates a schematic flowchart of an installed-application management method for a terminal according to an embodiment of the present invention.

Optionally, after the terminal installs various applications, it may be required to periodically verify the installed applications on the terminal. The embodiments of the present invention provide an installed-application management method for the terminal, as shown in FIG. 4, which may specifically include the following steps.

Step S401: The terminal generates a verification message list according to the content of the one or more installed application installation packages.

Step S402: The terminal sends the verification message list to the application server.

Step S403: The application server compares the verification messages in the verification message list with the stored verification messages.

Step S404: The application server determines an abnormal application on the terminal according to an inconsistent verification message when determining that the verification message in the verification message list is inconsistent with any stored verification message.

Step S405: The application server sends a reminder message corresponding to the abnormal application to the terminal.

Specifically, in Step S401 and Step S402, the terminal may generate a list of verification messages at every preset time-period, such as one week, one month, or one quarter, etc. The verification message list includes verification messages corresponding to all applications currently installed by the terminal. Each verification message in the verification message list may carry a corresponding application identifier. For example, the terminal has five applications installed, and the application identifiers of the five applications are App1, App2, App3, App4, and App5. For any one application, a verification message is generated according to the content of the application installation package of the application. The verification message is set to a hash value, and the verification messages corresponding to the five applications are Hash1, Hash2, Hash3, Hash4, and Hash5. According to the application identifiers and verification messages of the five applications, the list of verification messages of the terminal are determined as shown in Table 1:

TABLE 1

| Application Identifier | Verification Messages |
|---|---|
| App1 | Hash1 |
| App2 | Hash2 |
| App3 | Hash3 |
| App4 | Hash4 |
| App5 | Hash5 |

In Step S403 and Step S404, the application server determines verification messages corresponding to the verification message list from the stored verification messages according to the application identifiers in the verification message list, and then one-by-one compares the verification messages in the verification message list with the corresponding stored verification messages on the application server. When it is determined that any verification message in the verification message list is inconsistent with the corresponding stored verification message, the abnormal application on the terminal is determined according to the inconsistent verification message. When it is determined that all verification messages in the verification message list are consistent with the stored verification message, a message that the installed applications are normal is sent to the terminal. The following is a specific example. The verification messages corresponding to the verification message list determined by the application server from the stored verification messages are as shown in Table 2:

TABLE 2

| Application Identifier | Verification Messages |
|---|---|
| App1 | Hash1 |
| App2 | Hash6 |
| App3 | Hash3 |
| App4 | Hash4 |
| App5 | Hash5 |

After comparing the verification messages in Table 1 and Table 2, it can be seen that the verification message of App2 in Table 1 is inconsistent with the verification message of App2 in Table 2, so it can be concluded that the abnormal application on the terminal is App2, and other applications are normal.

In Step S405, after determining the abnormal application on the terminal, the application server may send a reminder message corresponding to the abnormal application to the terminal, and the terminal further processes the abnormal application according to the reminder message. The application server may also send an abnormal-application uninstall instruction or an stop-running instruction to the terminal, so that the terminal uninstalls the abnormal application or stops running the abnormal application.

Because the terminal periodically generates a verification message list according to the content of the installed application installation packages, and sends the verification message list to the application server, the application server compares the verification messages in the verification message list with the stored verification messages to determine any abnormality on the terminal. Thus, periodic auditing of installed applications on the terminal can be realized to ensure the security of the applications on the terminal.

Figure 5:
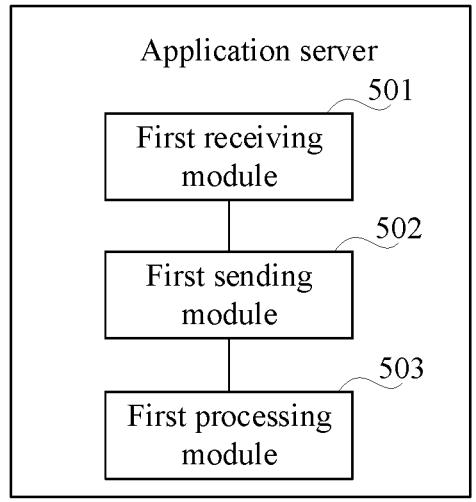
FIG. 5 illustrates a schematic structural diagram of an application server according to an embodiment of the present invention.

Based on the same technical concept, FIG. 5 exemplarily shows the structure of an application server provided by an embodiment of the present invention, which can execute the flow of the application management method for the terminal. The application server includes the followings.

A first receiving module 501 is configured to receive an application download request sent by the terminal.

A first sending module 502 is configured to send an application installation package corresponding to the application download request to the terminal; the application installation package passes the security check by the application server.

The first receiving module 501 is further configured to receive a first verification message sent by the terminal, where the first verification message is generated by the terminal according to the content of the received application installation package.

A first processing module 503 is configured to compare the first verification message with a stored second verification message, where the second verification message is generated by the first processing module 503 according to the content of the application installation package that passes the security check. When it is determined that the first verification message is consistent with the second verification message, an permit-to-install message is sent to the terminal, so that the terminal installs an application according to the received application installation package.

Optionally, the verification message carries an application identifier corresponding to the application installation package.

The first processing module 503 is specifically configured to: determine, according to the application identifier carried in the first verification message, a second verification message corresponding to the application identifier from the stored verification messages; and compare the first verification message with the second verification message corresponding to the application identifier.

Optionally, the first receiving module 501 is further configured to: receive a verification message list sent by the terminal, where the verification message list is generated by the terminal according to content of the installed application installation packages.

The first processing module 503 is further configured to: compare the verification messages in the verification message list with the stored verification messages; determine any verification message in the verification message list inconsistent with the stored verification messages; and determine an abnormal application on the terminal according to the inconsistent verification messages.

The first sending module 502 is further configured to: send a reminder message corresponding to the abnormal application to the terminal.

Figure 6:
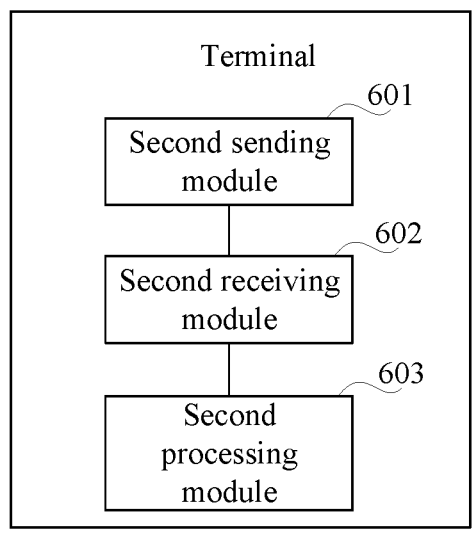
FIG. 6 illustrates a schematic structural diagram of a terminal according to an embodiment of the present invention.

Based on the same technical concept, FIG. 6 exemplarily shows a structure of a terminal provided by an embodiment of the present invention, and the terminal can execute a flow of an application management method for the terminal. The terminal includes the followings.

A second sending module 601 is configured to send an application download request to the application server.

A second receiving module 602 is configured to receive an application installation package sent by the application server, and generate a first verification message according to the content of the received application installation package; the application installation package sent by the application server passes security check by the application server.

The second sending module 601 is configured to send the first verification message to the application service, so that the application server compares the first verification message with a stored second verification message, where the second verification message is generated by the application server according to the content of the application installation package that passes security check by the application server.

A second processing module 603 is configured to: when receiving the permit-to-install message sent by the application server, install the application according to the received application installation package, where the permit-to-install message is sent by the application server after determining that the first verification message and the second verification message are consistent.

Optionally, the first verification message carries an application identifier corresponding to the application installation package.

The second sending module 601 is specifically configured to: send the first verification message that carries the application identifier corresponding to the application installation package to the application server, so that the application server, based on the application identifier carried in the first verification message, determines a second verification message corresponding to the application identifier from the stored verification messages.

Optionally, the second processing module 603 is further configured to: generate a verification message list according to the content of the installed application installation packages.

The second sending module 601 is further configured to: send the verification message list to the application server, so that the application server compares the verification messages in the verification message list with the stored verification messages.

The second processing module 603 is further configured to: when receiving a reminder message corresponding to an abnormal application sent by the application server, determine an abnormal application according to the reminder message, where the abnormal application is determined by the application server, after determining that the verification message in the verification message list is inconsistent with the stored verification messages, based on the inconsistent verification message.

Thus, the embodiments of the present invention provide an application management method for a terminal, an application server, and a terminal, including: an application server receives an application download request sent by a terminal; the application server sends an application installation package corresponding to the application download request to the terminal, where the application installation package passes the security check by the application server; the application server receives the first verification message sent by the terminal, and the first verification message is generated by the terminal according to the content of the received application installation package; the application server compares the first verification message with a stored second verification message, and the second verification message is generated by the application server according to the content of the application installation package that passes the security check; after determining that the first verification message is consistent with the second verification message, the application server sends a permit-to-install message to the terminal, so that the terminal installs the application according to the received application installation package. Accordingly, the application server, after the security check of the application installation package, generates the second verification message according to the content of the application installation package. After receiving the application installation package, the terminal generates the first verification message according to the content of the received application installation package, and sends the first verification message to the application server, and then the application server determines, according to the first verification message and the second verification message, the legitimacy of the application package received by the terminal is verified. That is, it does not need the terminal to verify the legitimacy of the application package by using the certificate, thereby reducing the certificate work management for the terminal and improving the efficiency of application installation. Further, when the application verification method needs to be upgraded, only the application server needs to be upgraded or replaced, and the terminal is not required to be upgraded or replaced, thereby improving the timeliness of the application verification upgrade.

Based on the same technical concept, an embodiment of the present invention provides an application server. The application server includes at least one processor; and a memory communicatively coupled to the at least one processor. The memory stores instructions executable by the at least one processor, the instructions may be executed by the at least one processor such that the at least one processor is capable of executing the application management method for the terminal in the above embodiments.

Figure 7:
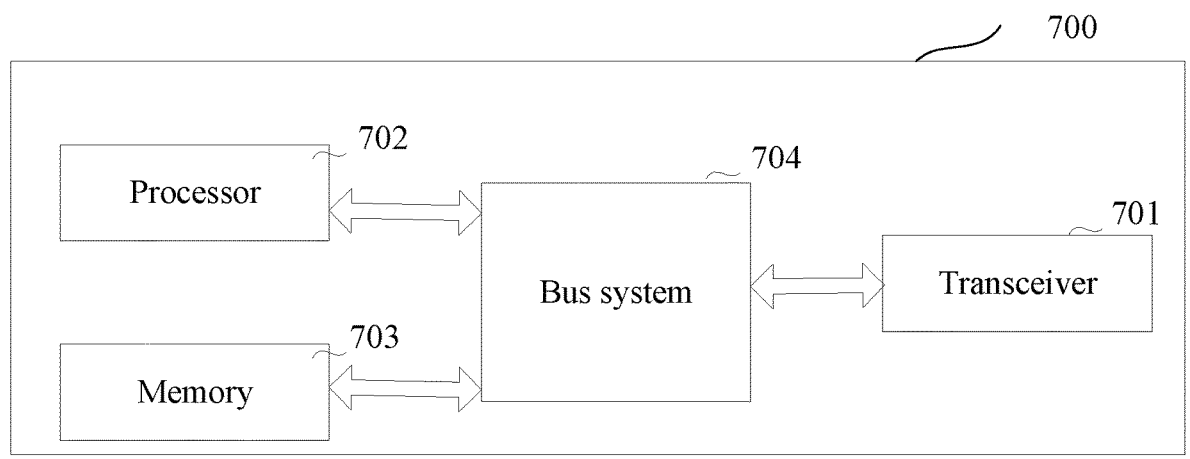
FIG. 7 illustrates a schematic structural diagram of an application server according to an embodiment of the present invention.

Taking one processor as an example, FIG. 7 is a structure of an application server according to an embodiment of the present invention. The application server 700 includes: a transceiver 701, a processor 702, a memory 703, and a bus system 704.

The memory 703 is used to store a computer program. In particular, the computer program can include program code, the program code including computer operating instructions. The memory 703 may be a random-access memory (RAM) or a non-volatile memory such as at least one disk storage. Although only one memory is shown in the figure, of course, the memory can also be as many as needed. Memory 703 can also be a memory in processor 702.

The memory 703 stores various elements, such as various executable modules or data structures, or a subset thereof, or an extended set thereof.

Operating instructions: including various operating instructions for implementing various operations.

Operating system: Including a variety of system programs for implementing various basic services and handling hardware-based tasks.

The application management method for the terminal in the foregoing embodiments of the present invention may be applied to the processor 702 or implemented by the processor 702. Processor 702 may be an integrated circuit chip with signal processing capabilities. In the implementation process, each step of the application management method of the foregoing terminal may be completed by an integrated logic circuit of hardware in the processor 702 or an instruction in the form of software. The processor 702 described above may be a general-purpose processor, a digital signal processor (DSP), an application specific integrated circuit (ASIC), a field programmable gate array (FPGA) or other programmable logic device, a discrete gate or transistor logic device, or discrete hardware component. Thus, the methods, steps, and logical block diagrams disclosed in the embodiments of the present application can be implemented or executed. The general-purpose processor may be a microprocessor or the processor or any conventional processor or the like. The steps of the method disclosed in the embodiments of the present invention may be directly implemented by the hardware decoding processor, or may be performed by a combination of hardware and software modules in the decoding processor. The software module can be located in a conventional storage medium such as random-access memory, flash memory, read only memory, programmable read only memory or electrically erasable programmable memory, registers, and the like. The storage medium may be located in the memory 703, and the processor 702 reads the information in the memory 703 and performs the following steps in conjunction with its hardware.

The transceiver 701 is configured to receive an application download request sent by the terminal; send an application installation package corresponding to the application download request to the terminal, where the application installation package passed security check; and receive a first verification message sent by the terminal, where the first verification message is generated by the terminal according to the content of the received application installation package.

The processor 702 is configured to compare the first verification message with a stored second verification message, where the second verification message is generated according to the content of the application installation package that passed the security check; and, after determining that the first verification message is consistent with the second verification message, send an permit-to-install message to the terminal, so that the terminal installs an application according to the received application installation package.

Optionally, the verification message carries an application identifier corresponding to the application installation package.

The processor 702 is configured to: determine, according to the application identifier carried in the first verification message, a second verification message corresponding to the application identifier from the stored verification messages; and compare the first verification message with the second verification message corresponding to the application identifier.

Optionally, the transceiver 701 receives a verification message list sent by the terminal, where the verification message list is generated by the terminal according to content of the installed application installation packages.

The processor 702 compares the verification messages in the verification message list with the stored verification messages; and, when determining that a verification message in the verification message list is inconsistent with the stored verification messages, determines an abnormal application on the terminal according to the inconsistent verification message.

The transceiver 701 sends a reminder message corresponding to the abnormal application to the terminal.

Based on the same technical concept, an embodiment of the present invention provides a terminal. The terminal includes at least one processor; and a memory communicatively coupled to the at least one processor. The memory stores instructions executable by the at least one processor, and when the instructions is executed by the at least one processor, the at least one processor can execute the application management method of the terminal in the above embodiments.

Figure 8:
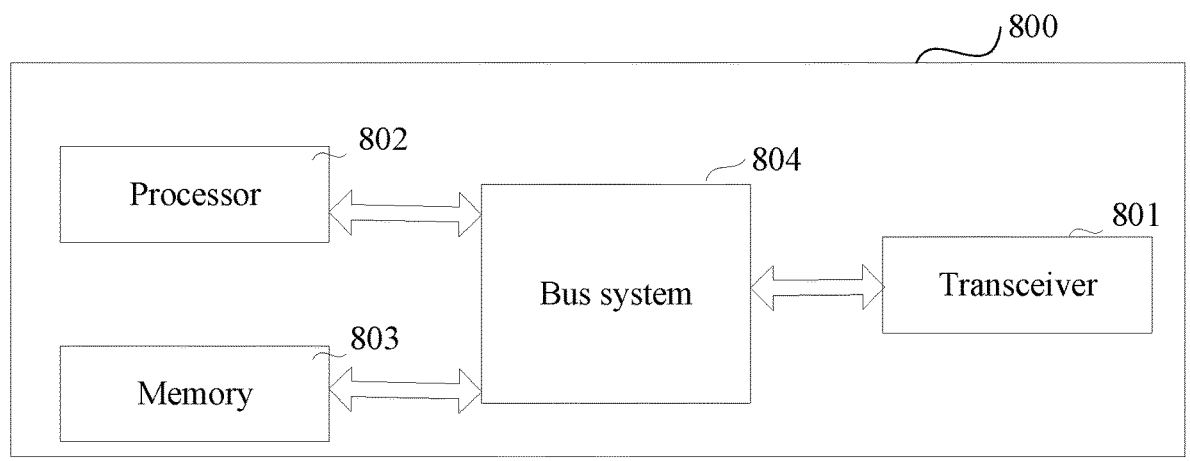
FIG. 8 illustrates a schematic structural diagram of a terminal according to an embodiment of the present invention.

Using one processor as an example, FIG. 8 is a structure of a terminal according to an embodiment of the present invention. The terminal 800 includes: a transceiver 801, a processor 802, a memory 803, and a bus system 804.

The memory 803 is used to store a computer program. In particular, the computer program can include program code, and the program code includes computer operating instructions. The memory 803 may be a random-access memory (RAM) or a non-volatile memory, such as at least one disk storage. Although only one memory is shown in the figure, the memory can also be as many as needed. Memory 803 can also be a memory in processor 802.

The memory 803 various elements, such as various executable modules or data structures, or a subset thereof, or an extended set thereof.

Operating instructions: including various operating instructions for implementing various operations.

Operating system: Including a variety of system programs for implementing various basic services and handling hardware-based tasks.

The application management method of the terminal in the foregoing embodiments of the present invention may be applied to the processor 802 or implemented by the processor 802. Processor 802 may be an integrated circuit chip with signal processing capabilities. In the implementation process, each step of the application management method of the foregoing terminal may be completed by an integrated logic circuit of hardware in the processor 802 or an instruction in a form of software. The processor 802 described above may be a general-purpose processor, a digital signal processor (DSP), an application specific integrated circuit (ASIC), a field programmable gate array (FPGA) or other programmable logic device, a discrete gate or transistor logic device, or discrete hardware component. Thus, the methods, steps, and logical block diagrams disclosed in the embodiments of the present application can be implemented or executed. The general-purpose processor may be a microprocessor or the processor or any conventional processor or the like. The steps of the method disclosed in the embodiments of the present invention may be directly implemented by the hardware decoding processor, or may be performed by a combination of hardware and software modules in the decoding processor. The software module can be located in a conventional storage medium such as random-access memory, flash memory, read only memory, programmable read only memory or electrically erasable programmable memory, registers, and the like. The storage medium is located in the memory 803, and the processor 802 reads the information in the memory 803 and performs the following steps in conjunction with its hardware.

The transceiver 801 is configured to send an application download request to the application server, receive an application installation package sent by the application server, and generate a first verification message according to the content of the received application installation package, where the application installation package sent by the application server passed the security check; send the first verification message to the application server, so that the application server compares the first verification message with a stored second verification message, where the second verification message is generated by the application server based on the content of the application installation package that passed the security check.

The processor 802 is configured to, when receiving a permit-to-install message sent by the application server, install an application according to the received application installation package, where the permit-to-install message is send by the application server after determining that the first verification message and the second verification message are consistent.

Optionally, the verification message carries an application identifier corresponding to the application installation package.

The transceiver 801 sends the first verification message carrying the application identifier corresponding to the application installation package to the application server, so that the application server determines, according to the application identifier carried by the first verification message, a second verification message from the stored verification messages corresponding to the application identifier.

Optionally, the processor 802 generates a verification message list according to the content of the installed application installation packages.

The transceiver 801 sends the verification message list to the application server, so that the application server compares the verification messages in the verification message list with the stored verification messages.

When receiving a reminder message corresponding to an abnormal application sent by the application server, the processor 802 determine an abnormal application according to the reminder message, where the abnormal application is determined by the application server, after determining that the verification message in the verification message list is inconsistent with the stored verification messages, based on the inconsistent verification message.

Those skilled in the art can understand that all or part of the steps of implementing the above embodiments may be completed by a computer program instructing related hardware, and the program is stored in a storage medium, and includes a plurality of instructions for causing a device (which may be a single chip microcomputer, a chip, etc.) or a processor to execute all or part of the steps of the various embodiments of the present invention. The foregoing storage medium includes: a U-disk, a mobile hard disk, a read-only memory (ROM), a random-access memory (RAM), a magnetic disk, or an optical disk, and the like.

Accordingly, embodiments of the present invention provide a computing device, which may be a desktop computer, a portable computer, a smart phone, a tablet computer, a personal digital assistant (PDA), or the like. The computing device may include a central processing unit (CPU), a memory, an input/output device, etc. The input device may include a keyboard, a mouse, a touch screen, etc., and the output device may include a display device such as a liquid crystal display (Liquid Crystal Display, LCD), cathode ray tube (CRT), etc.

The memory may include read only memory (ROM) and random-access memory (RAM) and provide the processor with program instructions and data stored in the memory. In the embodiments of the present invention, the memory may be used to store program instructions of the application management method of the terminal;

The processor may be configured to invoke the program instructions stored in the memory, and execute an application management method of the terminal according to the obtained program.

Embodiments of the present invention provide a computer-readable storage medium storing computer-executable instructions for causing the computer to execute an application management method of a terminal.

Those skilled in the art will appreciate that embodiments of the present invention can be provided as a method, or a computer program product. Accordingly, the present invention may take the form of an entirely hardware embodiment, an entirely software embodiment, or a combination of software and hardware. Moreover, the embodiments of the present invention can take the form of a computer program product embodied on one or more computer-usable storage media (including but not limited to disk storage, CD-ROM, optical storage, etc.) including computer usable program code.

The present invention has been described with reference to flowchart illustrations and/or block diagrams of methods, apparatus (system), and computer program products according to embodiments of the invention. It will be understood that each flow and/or block of the flowchart illustrations and/or block diagrams, or combinations of the flow and/or block of the flowchart illustrations and/or block diagrams can be implemented by computer program instructions. These computer program instructions can be provided to a processor of a general-purpose computer, special purpose computer, embedded processor, or other programmable data processing device to produce a machine, such that the execution of instructions by a processor of the computer or other programmable data processing device can realize an apparatus for implementing the functions specified in one or more flows and/or one or more blocks in the flowcharts and/or block diagrams.

These computer program instructions can also be stored in computer-readable storage medium to cause a computer or other programmable data processing device to operate in a certain way, such that the instructions stored in the computer-readable storage medium can generate a manufacturing product including an instruction apparatus, and the instruction apparatus can implement the functions specified in one or more flows and/or one or more blocks in the flowcharts and/or block diagrams.

The computer program instructions can also be loaded in a computer or other programmable data processing device, such that a series of operating steps can be executed on the computer or other programmable data process device to generate computer-realized processing. Thus, the instructions executed on the computer or other programmable data processing device provide steps for implementing the functions specified in one or more flows and/or one or more blocks in the flowcharts and/or block diagrams.

While certain embodiments of the invention have been described, those skilled in the art, after understanding the basic inventive concepts, can make additional modifications and changes on these embodiments. Thus, the appended claims are intended to be interpreted as including these embodiments and all variations and the modifications within the scope of the present invention.

It is apparent that those skilled in the art can make various modifications and variations to the present invention without departing from the spirit and scope of the present invention. Thus, it is intended that the present invention cover the variations and modifications of the present invention, as long as these variations and modifications are within the scope of the claims of the present invention.

What is claimed is:

1. An application management method of a terminal, comprising:

receiving, by an application server, an application download request sent by the terminal;

sending, by the application server, an application installation package corresponding to the application download request to the terminal, the application installation package having passed a security check by the application server;

receiving, by the application server, a first verification message sent by the terminal, wherein the first verification message is generated by the terminal according to content of the received application installation package;

comparing, by the application server, the first verification message with a stored second verification message, wherein the second verification message is generated by the application server according to content of the application installation package having passed the security check;

after determining that the first verification message is consistent with the second verification message, sending, by the application server, a permit-to-install message to the terminal, such that the terminal installs an application according to the received application installation package; and after the application installation package is installed on the terminal, periodically verifying applications installed on the terminal, including:

receiving, by the application server, a verification message list sent by the terminal, wherein the verification message list is generated by the terminal according to content of installed application installation packages;

comparing, by the application server, verification messages in the verification message list with stored verification messages;

after determining that a verification message in the verification message list is inconsistent with the stored verification messages, determining, by the application server, an abnormal application on the terminal according to the inconsistent verification message; and sending, by the application server, a reminder message corresponding to the abnormal application to the terminal.

2. The method according to claim 1, wherein:

the first verification message carries an application identifier corresponding to the application installation package;

the comparing, by the application server, the first verification message with a stored second verification message further includes:

determining, by the application server, the second verification message corresponding to the application identifier from stored verification messages according to the application identifier carried in the first verification message; and comparing, by the application server, the first verification message with the second verification message corresponding to the application identifier.

3. The method according to claim 1, further comprising: when the content of the application installation package is changed, changing, by the application server, the second verification message stored on the application server.

4. The method according to claim 1, wherein the verification message list includes verification messages generated by the terminal according to all applications currently installed on the terminal; and each verification message in the verification message list carries an application identifier of one of the applications currently installed.

5. An application management method for a terminal, comprising:

sending, by the terminal, an application download request to an application server;

receiving, by the terminal, an application installation package sent by the application server, and generating a first verification message according to content of the received application installation package, wherein the application installation package sent by the application server has passed a security check;

sending, by the terminal, the first verification message to the application server, such that the application server compares the first verification message with a stored second verification message, wherein the stored second verification message is generated by the application server according to content of the application installation package having passed the security check;

after receiving a permit-to-install message sent by the application server, installing, by the terminal, an application according to the received application installation package, wherein the permit-to-install message is sent by the application server after determining that the first verification message and the second verification message are consistent; and after installing the application, periodically verifying applications installed on the terminal, including:

generating, by the terminal, a verification message list according to the content of installed application installation packages;

sending, by the terminal, the verification message list to the application server, such that the application server compares verification messages in the verification message list with the stored verification messages; and after receiving a reminder message sent by the application server corresponding to an abnormal application, determining, by the terminal, the abnormal application according to the reminder message, wherein the abnormal application is determined based on a verification message in the verification message list that is inconsistent with the stored verification messages as determined by the application server.

6. The method according to claim 5, wherein:

the first verification message carries an application identifier corresponding to the application installation package; and the sending, by the terminal, the first verification message to the application server further includes:

sending, by the terminal, the first verification message that carries the application identifier corresponding to the application installation package to the application server, such that the application server determines, according to the application identifier carried in the first verification message, a corresponding second verification message from the stored verification messages.

7. An application server, comprising: a memory and a processor coupled to the memory, the processor being configured to:

receive an application download request sent by a terminal;

send an application installation package corresponding to the application download request to the terminal, the application installation package having passed a security check by the application server;

receive a first verification message sent by the terminal, and the first verification message is generated by the terminal according to content of the received application installation package;

compare the first verification message with a stored second verification message, wherein the second verification message is generated by the application server according to content of the application installation package having passed the security check, and after determining that the first verification message is consistent with the second verification message, to send a permit-to-install message to the terminal, such that the terminal installs an application according to the received application installation package; and after the application installation package is installed on the terminal, periodically verify applications installed on the terminal, including:

receiving, by the application server, a verification message list sent by the terminal, wherein the verification message list is generated by the terminal according to content of installed application installation packages;

comparing, by the application server, verification messages in the verification message list with stored verification messages;

after determining that a verification message in the verification message list is inconsistent with the stored verification messages, determining, by the application server, an abnormal application on the terminal according to the inconsistent verification message; and sending, by the application server, a reminder message corresponding to the abnormal application to the terminal.

8. The application server according to claim 7, wherein:

the first verification message carries an application identifier corresponding to the application installation package;

the processor is further configured to determine the second verification message corresponding to the application identifier from stored verification messages according to the application identifier carried in the first verification message, and to compare the first verification message with the second verification message corresponding to the application identifier.

9. A terminal, comprising: a memory and a processor coupled to the memory, the processor being configured to:

send an application download request to the application server;

receive an application installation package sent by the application server, and generate a first verification message according to content of the received application installation package, wherein the application installation package sent by the application server has passed a security check;

send the first verification message to the application server, such that the application server compares the first verification message with a stored second verification message; and wherein the stored second verification message is generated by the application server according to content of the application installation package having passed the security check;

after receiving a permit-to-install message sent by the application server, install an application according to the received application installation package, wherein the permit-to-install message is sent by the application server after determining that the first verification message and the second verification message are consistent; and after installing the application, periodically verifying applications installed on the terminal, including:

generating, by the terminal, a verification message list according to the content of installed application installation packages;

sending, by the terminal, the verification message list to the application server, such that the application server compares verification messages in the verification message list with the stored verification messages; and after receiving a reminder message sent by the application server corresponding to an abnormal application, determining, by the terminal, the abnormal application according to the reminder message, wherein the abnormal application is determined based on a verification message in the verification message list that is inconsistent with the stored verification messages as determined by the application server.

10. The terminal according to claim 9, wherein:

the first verification message carries an application identifier corresponding to the application installation package;

the processor is further is configured to send the first verification message that carries the application identifier corresponding to the application installation package to the application server, such that the application server determines, according to the application identifier carried in the first verification message, a corresponding second verification message from the stored verification messages.

* * * * *